(12) United States Patent
Berg

(10) Patent No.: US 12,061,375 B1
(45) Date of Patent: Aug. 13, 2024

(54) REVERSIBLY ATTACHABLE WINDOW SILL HELIOSTAT

(71) Applicant: Ezra Berg, Newton, MA (US)

(72) Inventor: Ezra Berg, Newton, MA (US)

( * ) Notice: Subject to any disclaimer, the term of this patent is extended or adjusted under 35 U.S.C. 154(b) by 0 days.

(21) Appl. No.: 18/417,090

(22) Filed: Jan. 19, 2024

(51) Int. Cl.
  *G02B 7/182* (2021.01)
  *F16B 5/07* (2006.01)
  *G02B 5/08* (2006.01)

(52) U.S. Cl.
  CPC ............... *G02B 7/182* (2013.01); *F16B 5/07* (2013.01); *G02B 5/08* (2013.01)

(58) Field of Classification Search
  CPC ........ G02B 5/08; G02B 5/0808; G02B 5/085; G02B 7/182; F16B 5/07
  USPC ........ 359/850, 855, 857, 862, 865, 871, 872
  See application file for complete search history.

(56) References Cited

U.S. PATENT DOCUMENTS

| | | | | |
|---|---|---|---|---|
| 248,492 A | * | 10/1881 | Moodhe | |
| 269,125 A | * | 12/1882 | Shipman | |
| 305,750 A | * | 9/1884 | Holberg | |
| 582,856 A | * | 5/1897 | Frostenson | |
| 584,078 A | * | 6/1897 | Jensen | |
| 774,131 A | * | 11/1904 | Bergman | |
| 866,658 A | * | 9/1907 | Johnsen | |
| 3,463,577 A | * | 8/1969 | Friedberg | A61N 5/06 126/684 |
| 4,775,180 A | * | 10/1988 | Phillips | B60J 1/2091 296/97.7 |
| 4,932,711 A | * | 6/1990 | Goebel | B60J 1/2091 296/97.7 |
| 5,625,500 A | * | 4/1997 | Ackerman | B60R 1/003 359/872 |
| 7,114,759 B1 | * | 10/2006 | Chen | B60J 1/2091 296/97.7 |
| 2006/0012897 A1 | * | 1/2006 | Reid | G02B 7/182 359/857 |

* cited by examiner

*Primary Examiner* — Ricky D Shafer
(74) *Attorney, Agent, or Firm* — Symbus Law Group, PLLC; Craig A. Simmermon

(57) ABSTRACT

A window reflector or heliostat is disclosed that is reversibly installed onto a window sill in order to reflect a view of the sun or sunlight into a room in a building. Window reflector or heliostat is a reflective member that is reversibly rigidly attached to a window sill on a window in a room. Window reflector or heliostat is an ultra-lightweight specially shaped biplanar reflective member with a reflectivity of 95 percent or greater at ninety degree incidence. Biplanar reflective member may be a one-piece assembly or a two-piece assembly with adjustable hinges. Window reflector or heliostat is reversibly attachable to the window sill using hook or loop attachment strips or window sill attachment fasteners.

1 Claim, 12 Drawing Sheets

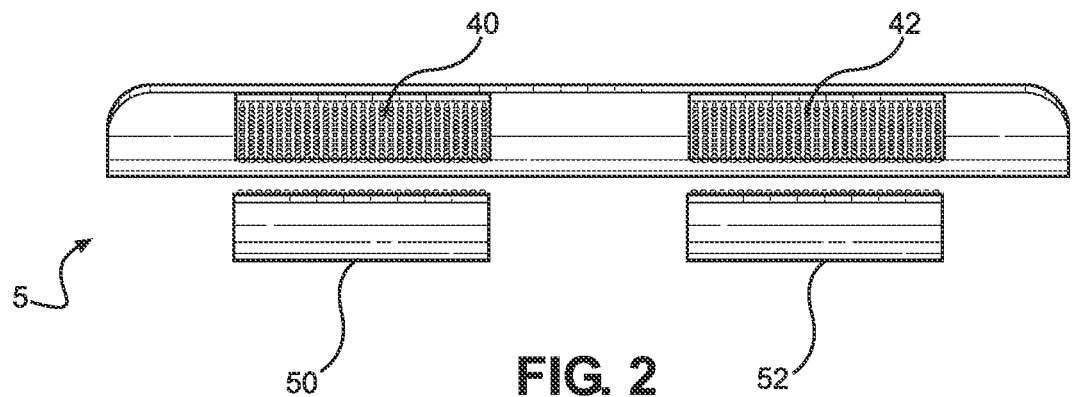
FIG. 2
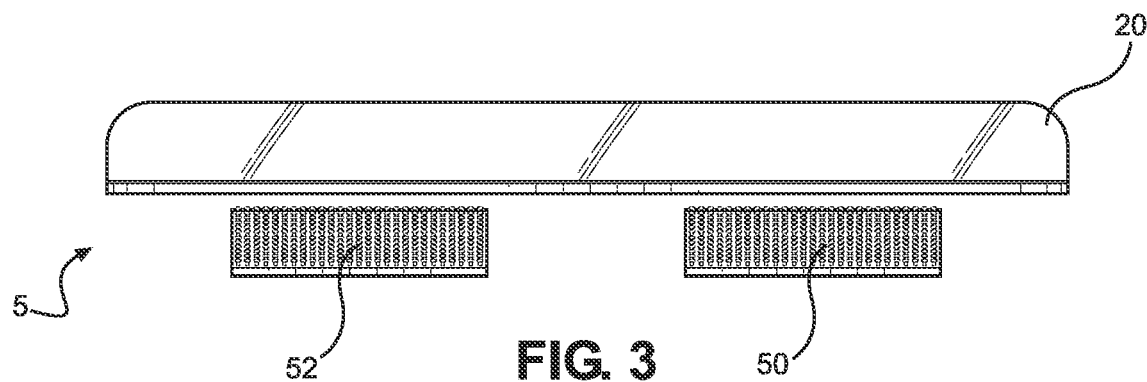
FIG. 3
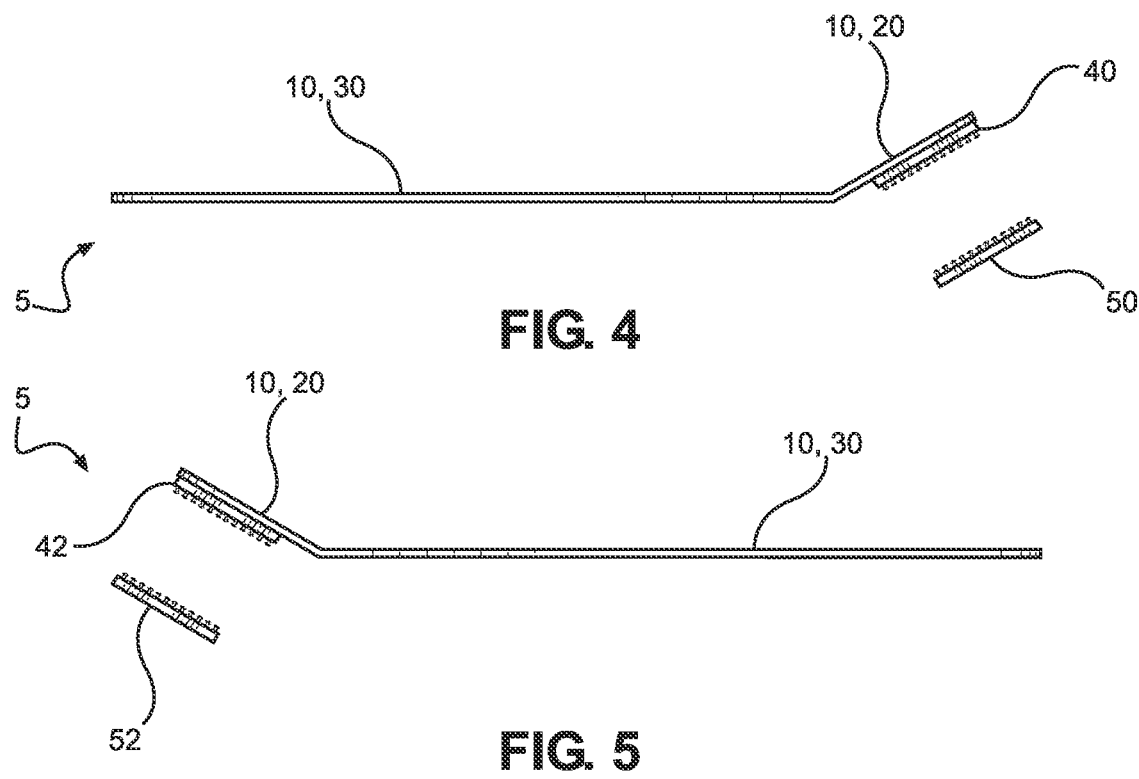
FIG. 4
FIG. 5

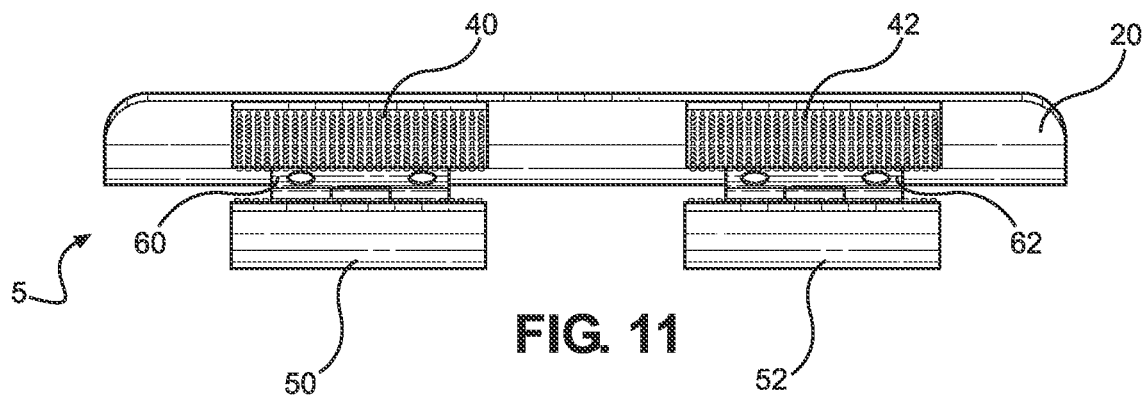
FIG. 11
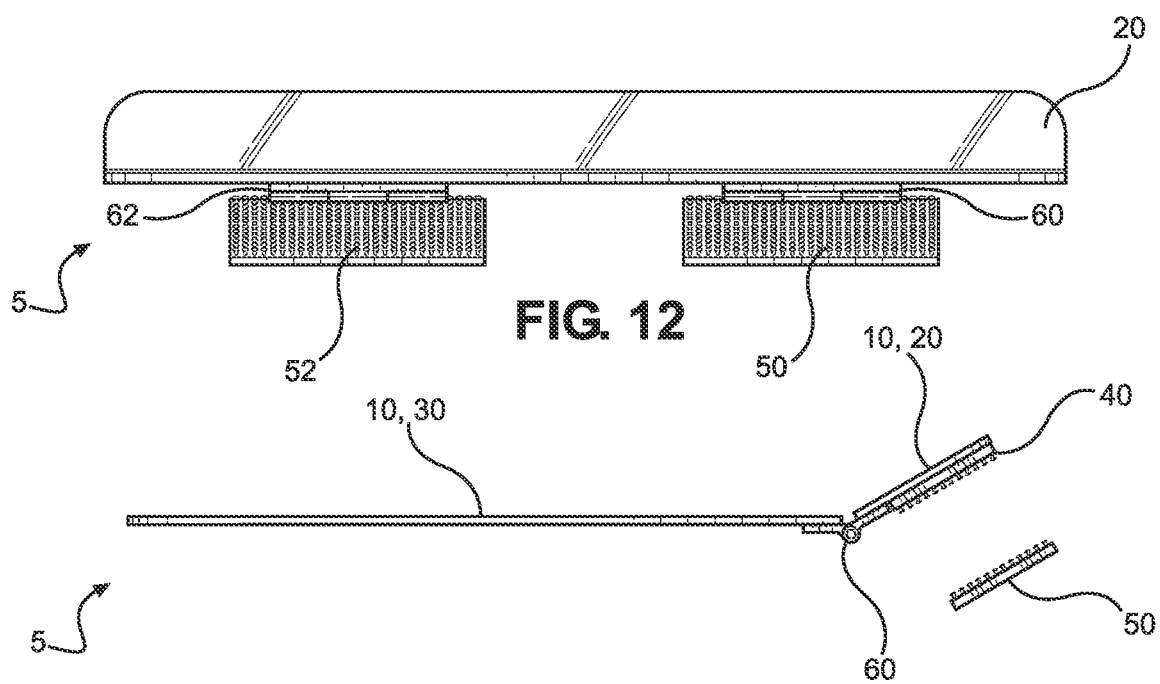
FIG. 12
FIG. 13
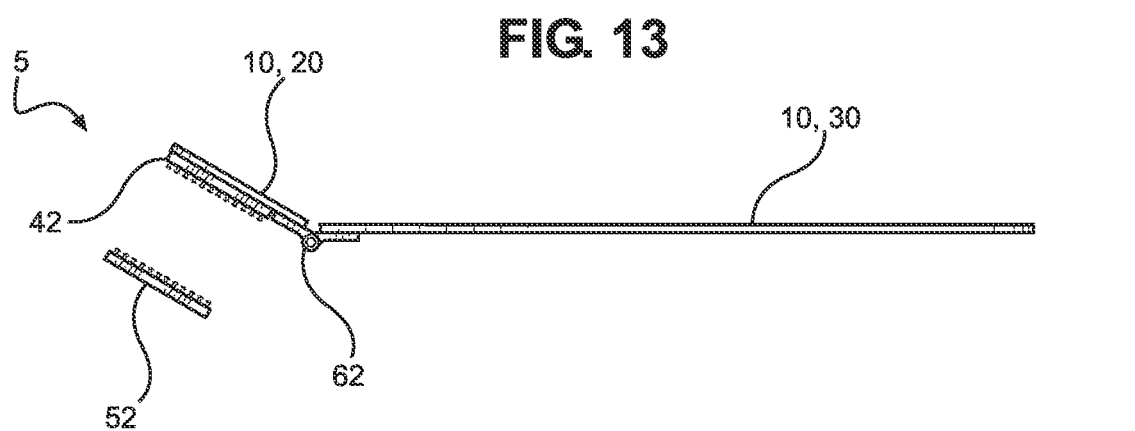
FIG. 14

REVERSIBLY ATTACHABLE WINDOW SILL HELIOSTAT

BACKGROUND OF THE INVENTION

1. Field of the Invention

This invention relates to a window reflector or heliostat that is installed onto a window sill in order to reflect a view of the sun, a view of the sky, or light from the sun into a room in a building. Specifically, this invention is reflective member that is reversibly rigidly attached to a window sill on a window in a room so that a reflection of the sun or the sky or light from the sun can be viewed from the interior of the room.

2. Description of Related Art

There are other window reflectors or heliostats in the prior art however there are none that are reversibly rigidly attachable to the sill, stool, or outer sill of a window with the attachment means shown and described below. Also, there are no window reflectors or heliostats in the prior art that comprise an ultra-lightweight specially shaped biplanar reflective member that is used to reflect an image of the sun or sky into a room.

BRIEF SUMMARY OF THE INVENTION

It is an aspect of reversibly attachable window sill heliostat to be extremely light weight that weighs two pounds or less.

It is an aspect of reversibly attachable window sill heliostat to have a biplanar reflective member that functions to reflect an image of the sky or sun into a room of a building.

It is an aspect of biplanar reflective member to have a reflectivity of 95 percent or greater at ninety degree incidence.

It is an aspect of an embodiment of biplanar reflective member to be a one-piece integral member.

It is an aspect of an embodiment of biplanar reflective member to be a two-piece integral member connected together by one or more torsion hinges.

It is an aspect of reversibly attachable window sill heliostat to reversibly rigidly attach to a window sill on a window.

It is an aspect of an embodiment of reversibly attachable window sill heliostat to reversibly rigidly attach to a window sill on a window with one or more hook and loop attachment strips.

It is an aspect of an embodiment of reversibly attachable window sill heliostat to reversibly rigidly attach to a window sill on a window with one or more hook and hook attachment strips.

It is an aspect of an embodiment of reversibly attachable window sill heliostat to reversibly rigidly attach to a window sill on a window with one or more attachment fasteners.

BRIEF DESCRIPTION OF THE DRAWINGS

FIG. 2 is a bottom plan view of the first embodiment of reversibly attachable window sill heliostat.

FIG. 3 is a top plan view of the first embodiment of reversibly attachable window sill heliostat.

FIG. 4 is a right side elevation view of the first embodiment of reversibly attachable window sill heliostat.

FIG. 5 is a left side elevation view of the first embodiment of reversibly attachable window sill heliostat.

FIG. 11 is a bottom plan view of the third embodiment of reversibly attachable window sill heliostat.

FIG. 12 is a top plan view of the third embodiment of reversibly attachable window sill heliostat.

FIG. 13 is a right side elevation view of the third embodiment of reversibly attachable window sill heliostat.

FIG. 14 is a left side elevation view of the third embodiment of reversibly attachable window sill heliostat.

DEFINITION LIST

Figure 1:
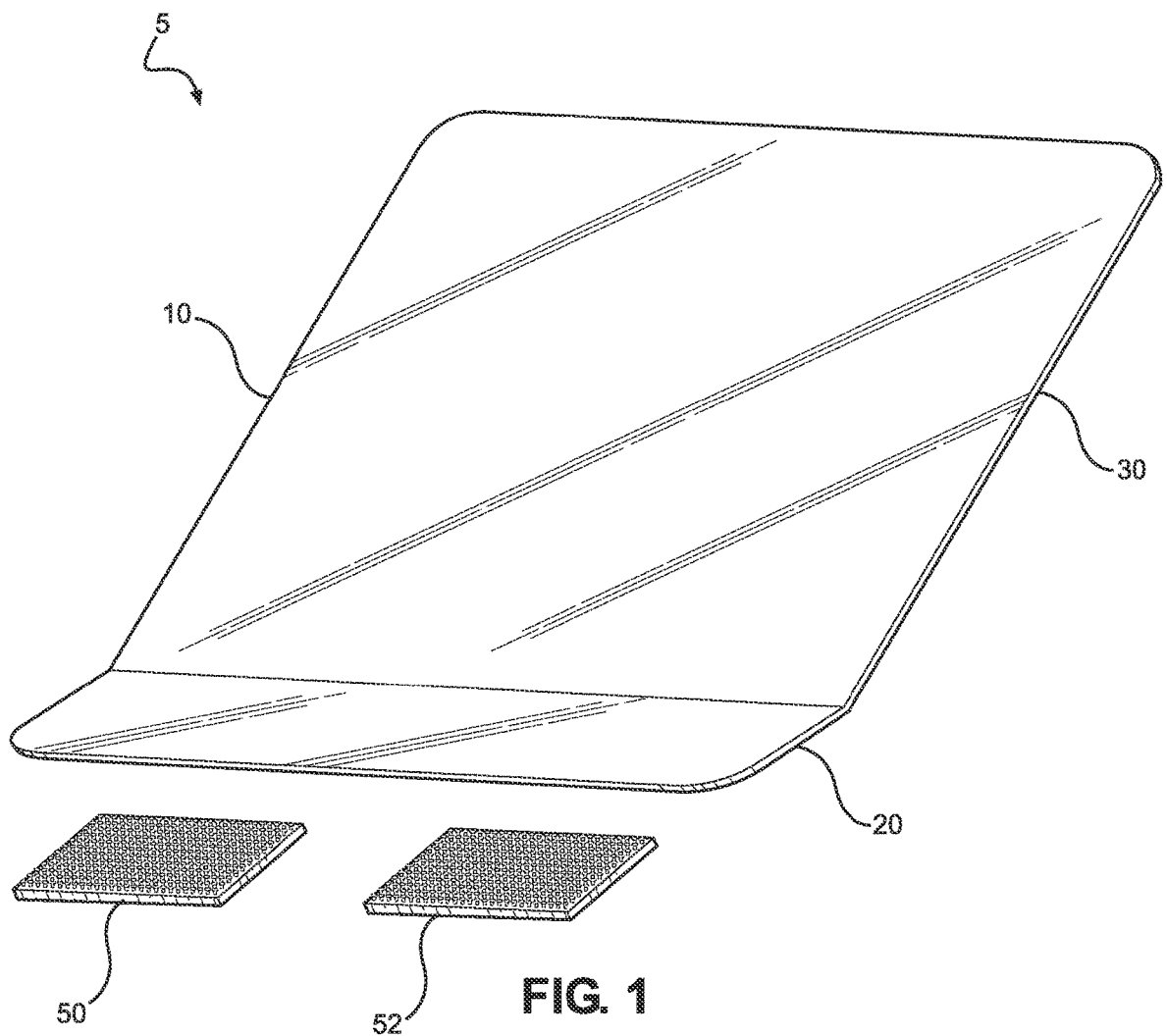
FIG. 1 is a front perspective view of a first embodiment of reversibly attachable window sill heliostat.
Figure 6:
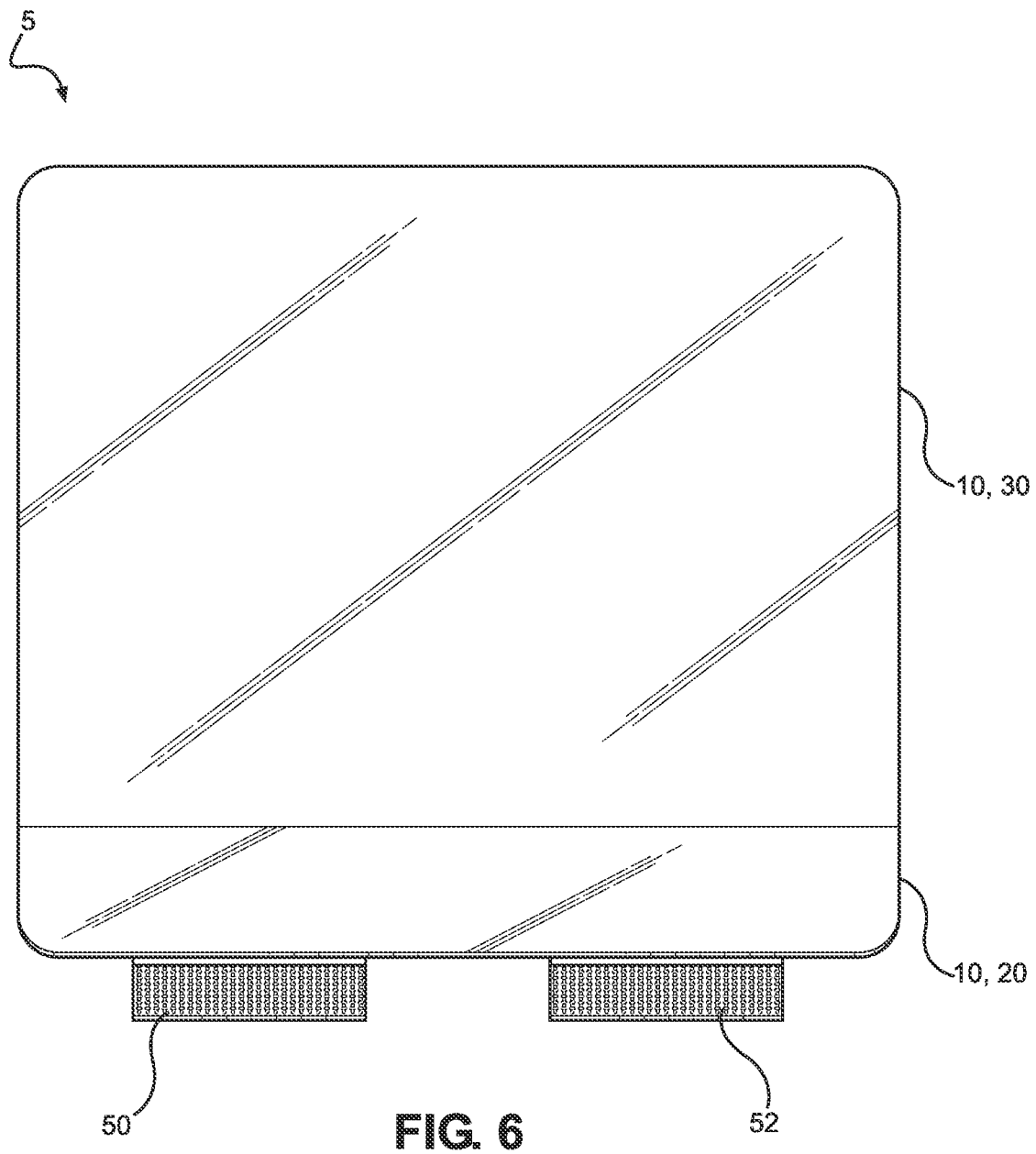
FIG. 6 is a front elevation view of the first embodiment of reversibly attachable window sill heliostat.
Figure 7:
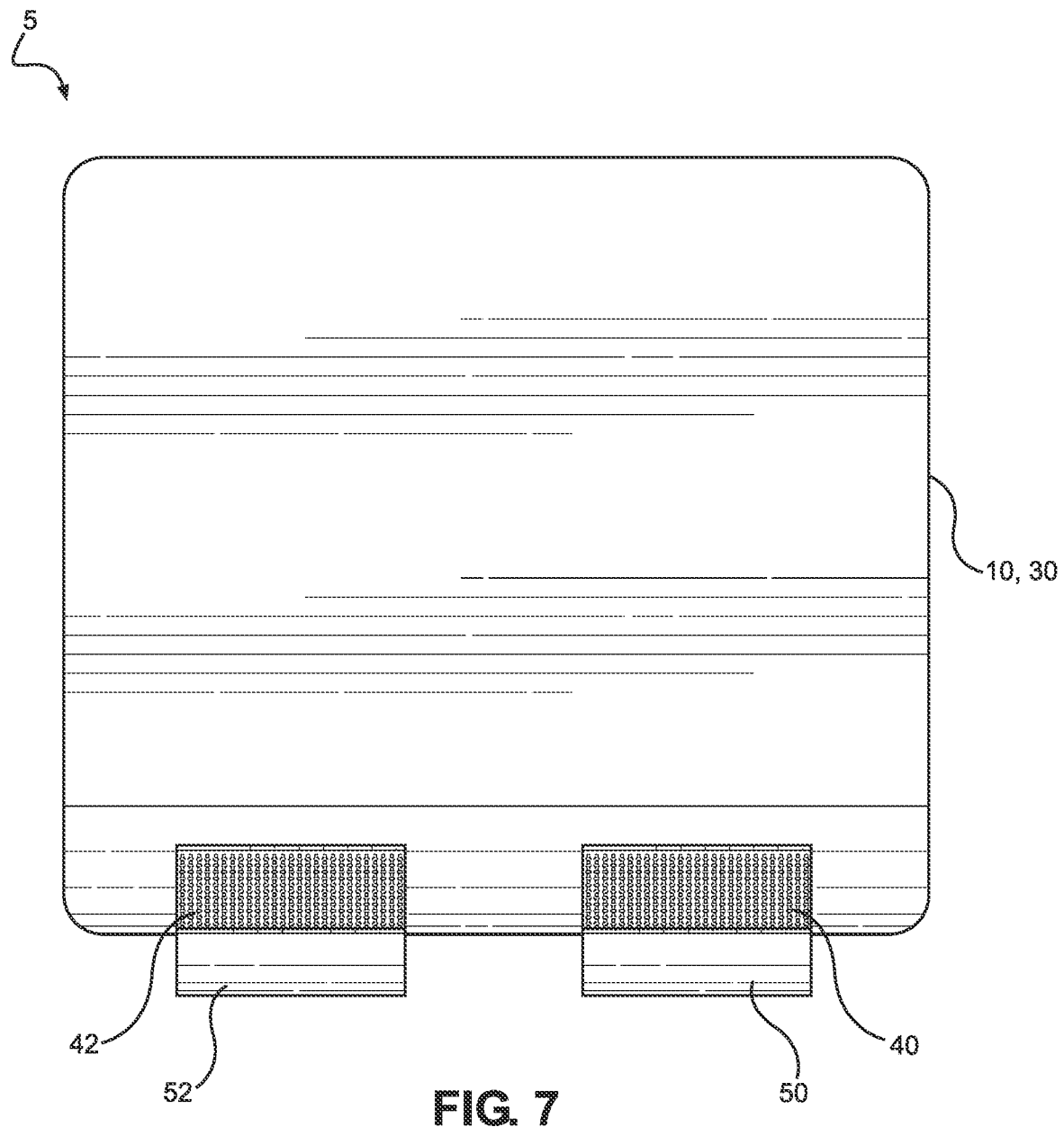
FIG. 7 is a rear elevation view of the first embodiment of reversibly attachable window sill heliostat.
Figure 8:
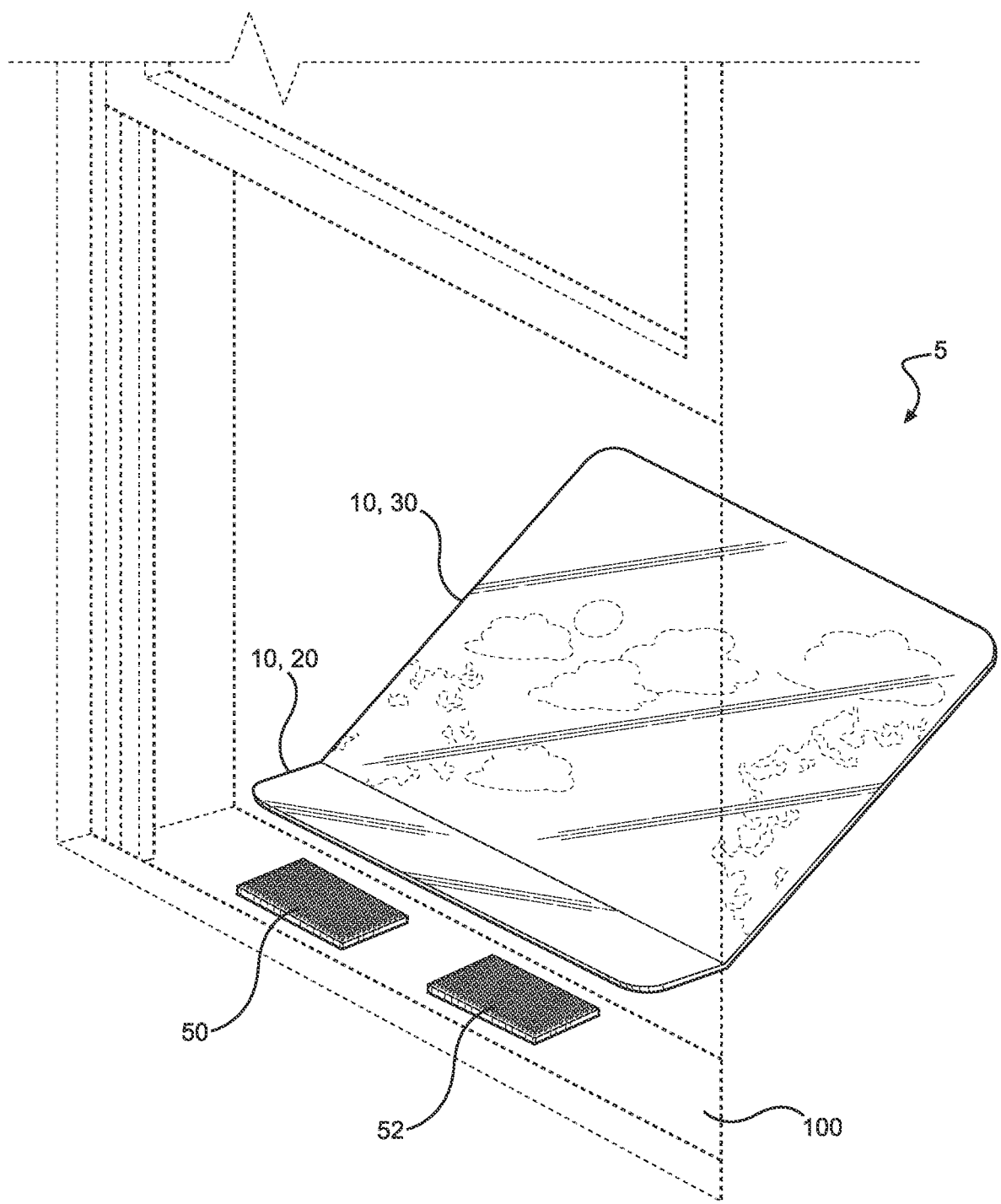
FIG. 8 is an environmental view of the first embodiment of reversibly attachable window sill heliostat depicting a reflection of the sky in the reversibly attachable window sill heliostat.

| Term | Definition |
| --- | --- |
| 5 | Reversibly Attachable Window Sill Heliostat |
| 10 | Lightweight Biplanar Reflective Member |
| 20 | Horizontal Reflective Plane |
| 30 | Angled Reflective Plane |
| 40 | First Reflective Member Hook or Loop Attachment Strip |
| 42 | Second Reflective Member Hook or Loop Attachment Strip |
| 44 | First Reflective Member Attachment Hole |
| 46 | Second Reflective Member Attachment Hole |
| 50 | First Window Sill Hook or Loop Attachment Strip |
| 52 | Second Window Sill Hook or Loop Attachment Strip |
| 54 | First Window Sill Attachment Fastener |
| 56 | Second Window Sill Attachment Fastener |
| 60 | First Adjustable Hinge |
| 62 | Second Adjustable Hinge |
| 100 | Window Sill |

DETAILED DESCRIPTION OF THE INVENTION

A heliostat can provide many benefits to a building occupant including consistent, high-quality natural light throughout the day, improving the overall lighting conditions in your home. Also, natural sunlight has been proven to have numerous health benefits, including supporting the regulation of circadian rhythms, boosting mood, and increasing productivity. By incorporating a heliostat into your home or workspace, you can create a brighter, more inviting living environment that enhances your well-being and overall quality of life.

Reversibly attachable window sill heliostat 5 comprises: a lightweight biplanar reflective member 10; a first reflective member hook or loop attachment strip 40; a second reflective member hook or loop attachment strip 42; a first window sill hook or loop attachment strip 50; and a second window sill hook or loop attachment strip 52. Reversibly attachable window sill heliostat 5 is reversibly rigidly attachable to a window sill 100 on a window in a house, apartment, or other building. The window sill 100 is permanently attached to the window in the house, apartment, or other building and is not a part of this invention. A window sill 100 has an upper surface, inside edge, a left edge, an outside edge, and a right edge. The first embodiment is depicted in FIGS. 1-8.

Lightweight biplanar reflective member 10 is an extremely lightweight or featherweight member that is two pounds or less. The lightweight aspect of lightweight biplanar reflective member 10 is crucial because it has been determined through testing and development that heavier reflective members do not function properly because heavier reflective members tend to get blown off the window sill 100 or become detached from the window sill 100 much more easily than lighter reflective members. If the lightweight biplanar reflective member 10 falls off of the window sill 100 then obviously there is a catastrophic failure of the product. The lightweight aspect of lightweight biplanar reflective member 10 solves this problem by staying attached to the window sill 100. In best mode, biplanar reflective member 10 is one pound or less which allows the biplanar reflective member 10 to stay rigidly attached to window sill 100 even during high winds of 20-30 miles per hour. It has been determined that reflective members weighing upwards of two pounds tend to catch the wind more easily, which can cause the reflective member to flutter, become detached, and fall off of the window sill 100. Therefore, lightweight biplanar reflective member 10 must weigh two pounds or less.

Lightweight biplanar reflective member 10 comprises: a horizontal reflective plane 20 and an angled reflective plane 30. Horizontal reflective plane 20 is a rigid planar member with an upper surface, a lower surface, a length, a width, a thickness, a first edge, a second edge, a third edge, a fourth edge, a longitudinal axis, and a latitudinal axis. The longitudinal axis of horizontal reflective plane 20 is parallel with the length of horizontal reflective plane 20. The latitudinal axis of horizontal reflective plane 20 is parallel with the width of horizontal reflective plane 20. The upper surface of horizontal reflective plane 20 is reflective and has a reflectivity of 95 percent or greater at ninety degree incidence. The reflectivity of the surface of a material is its effectiveness in reflecting radiant energy. Reflectivity is the fraction of incident electromagnetic power that is reflected by the reflective boundary or mirror. Reflectivity is the ratio of the reflected to incident electromagnetic power or magnitude of light, which can be expressed as a percentage. A reflectivity of 95 percent or greater is required to project or reflect a sufficient amount of natural sunlight light into the house, apartment, or other building. Horizontal reflective plane 20 may be made of any known material that meets the above parameters. In some of the best modes, horizontal reflective plane 20 is made 8 of polished aluminum or alternately plastic or composite material with a thin layer of metallic reflective material laminated to the upper surface.

Angled reflective plane 30 is a rigid planar member with an upper surface, a lower surface, a length, a width, a thickness, a first edge, a second edge, a third edge, a fourth edge, a longitudinal axis, and a latitudinal axis. The longitudinal axis of angled reflective plane 30 is parallel with the length of angled reflective plane 30. The latitudinal axis of angled reflective plane 30 is parallel with the width of angled reflective plane 30. The upper surface of angled reflective plane 30 is reflective and has a reflectivity of 95 percent or greater at normal incidence or ninety degree incidence. A reflectivity of 95 percent or greater is required to project or reflect a sufficient amount of natural sunlight light into the house, apartment, or other building. Angled reflective plane 30 may be made of any known material that meets the above parameters. In some of the best modes, angled reflective plane 30 is made of polished aluminum or alternately plastic or composite material with a thin layer of metallic reflective material laminated to the upper surface.

The width of horizontal reflective plane 20 is equivalent to the width of angled reflective plane 30. The width of horizontal reflective plane 20 and angled reflective plane 30 is about 10-80 inches. The length of angled reflective plane 30 is much greater than the length of horizontal reflective plane 20. The length of horizontal reflective plane 20 is about 1-15 inches. The length of angled reflective plane 30 is about 5-50 inches. The thickness of horizontal reflective plane 20 is equivalent to the thickness of angled reflective plane 30. The thickness of horizontal reflective plane 20 and angled reflective plane 30 is about 0.05-0.75 inches.

The third edge of horizontal reflective plane 20 is rigidly attached or connected to the first edge of angled reflective plane 30 so that the second edge of horizontal reflective plane 20 aligns with the second edge of angled reflective plane 30 and the fourth edge of horizontal reflective plane 20 aligns with the fourth edge of angled reflective plane 30. Rigid attachment may be accomplished by any known means such as: weld, solder, glue, epoxy, adhesive, bolts, screws, rivets, clips, snaps, pins, or fasteners. In best mode, horizontal reflective plane 20 and angled reflective plane 30 are integral and constructed from the same piece of material wherein one large sheet of material is bent to yield horizontal reflective plane 20 and angled reflective plane 30 and to form lightweight biplanar reflective member 10. Horizontal reflective plane 20 and angled reflective plane 30 form an angled connection wherein the upper surface of horizontal reflective plane 20 is at a 135-175 degree angle from the upper surface of angled reflective plane 30 as depicted. This angle is required to reflect the sun or sky into the room. In best mode, this angle is 150-160 degrees.

First reflective member hook or loop attachment strip 40 is a strip, band, or ribbon of hook-and-loop fastening material or a strip, band, or ribbon of hook-and-hook fastening material.

Hook-and-loop fastening material consist of two components: typically, two lineal fabric strips which are attached to the opposing surfaces to be fastened. The first component features tiny hooks and the second component features smaller loops. When the two components are pressed together the hooks on one component catch in the loops on the other component and the two pieces fasten or bind together. The two components are separated by pulling or peeling the two surfaces apart, thereby making a distinctive ripping sound. Hook-and-loop fastening material is a common product that is readily known in the marketplace. Hook-and-hook fastening material consist of two components: typically, two lineal fabric strips which are attached to the opposing surfaces to be fastened. The first component features tiny hooks and the second component also features tiny hooks. When the two components are pressed together the hooks on one component catch in the hooks on the other component and the two pieces fasten or bind together. The two components are separated by pulling or peeling the two surfaces apart, thereby making a distinctive ripping sound. Hook-and-hook fastening material is a common product that is readily known in the marketplace. Hook-and-hook fastening material is sometimes colloquially referred to as mushroom head fastening material. Thus, hooks and loops can fasten together and hooks and hooks can fasten together. However, loops and loops cannot fasten together. Hook-and-loop fastening material and hook-and-hook fastening material essentially function the same way by pressing the two strips together to fasten or attach and by pulling the two strips apart to unfasten or detach. Therefore, first reflective member hook or loop attachment strip 40 is a strip, band, or ribbon of fastening material with hooks or a strip, band, or ribbon of fastening material with loops. If first reflective member hook or loop attachment strip 40 is a strip, band, or ribbon of fastening material with hooks, then first window sill hook or loop attachment strip 50 is a strip, band, or ribbon of fastening material with loops or a strip, band, or ribbon of fastening material with hooks. If first reflective member hook or loop attachment strip 40 is a strip, band, or ribbon of fastening material with loops, then first window sill hook or loop attachment strip 50 is a strip, band, or ribbon of fastening material with hooks. First reflective member hook or loop attachment strip 40 has a fastening surface and an adhesive surface. The fastening surface of first reflective member hook or loop attachment strip 40 is the surface with the hooks or loops. The adhesive surface of first reflective member hook or loop attachment strip 40 is coated with a layer of adhesive, glue, cement, or epoxy. The adhesive surface of first reflective member hook or loop attachment strip 40 functions to attach first reflective member hook or loop attachment strip 40 to the lower surface of horizontal reflective plane 20. The adhesive surface of first reflective member hook or loop attachment strip 40 is attached to the lower surface of horizontal reflective plane 20, adjacent to the second edge of horizontal reflective plane 20, as depicted. Reversibly attachable window sill heliostat 5 is shipped to the customer with the first reflective member hook or loop attachment strip 40 is already attached to the lower surface of horizontal reflective plane 20 as depicted.

Second reflective member hook or loop attachment strip 42 is a strip, band, or ribbon of hook-and-loop fastening material or a strip, band, or ribbon of hook-and-hook fastening material.
Second reflective member hook or loop attachment strip 42 is a strip, band, or ribbon of fastening material with hooks or a strip, band, or ribbon of fastening material with loops. If second reflective member hook or loop attachment strip 42 is a strip, band, or ribbon of fastening material with hooks, then second window sill hook or loop attachment strip 52 is a strip, band, or ribbon of fastening material with loops or a strip, band, or ribbon of fastening material with hooks. If second reflective member hook or loop attachment strip 42 is a strip, band, or ribbon of fastening material with loops, then second window sill hook or loop attachment strip 52 is a strip, band, or ribbon of fastening material with hooks. Second reflective member hook or loop attachment strip 42 has a fastening surface and an adhesive surface. The fastening surface of second reflective member hook or loop attachment strip 42 is the surface with the hooks or loops. The adhesive surface of second reflective member hook or loop attachment strip 42 is coated with a layer of adhesive, glue, cement, or epoxy. The adhesive surface of second reflective member hook or loop attachment strip 42 functions to attach second reflective member hook or loop attachment strip 42 to the lower surface of horizontal reflective plane 20. The adhesive surface of second reflective member hook or loop attachment strip 42 is attached to the lower surface of horizontal reflective plane 20, adjacent to the third edge of horizontal reflective plane 20, as depicted. Reversibly attachable window sill heliostat 5 is shipped to the customer with the second reflective member hook or loop attachment strip 42 is already attached to the lower surface of horizontal reflective plane 20 as depicted.

First window sill hook or loop attachment strip 50 is a strip, band, or ribbon of hook-and-loop fastening material or a strip, band, or ribbon of hook-and-hook fastening material. First window sill hook or loop attachment strip 50 is a strip, band, or ribbon of fastening material with hooks or a strip, band, or ribbon of fastening material with loops. If first window sill hook or loop attachment strip 50 is a strip, band, or ribbon of fastening material with hooks, then first reflective member hook or loop attachment strip 40 is a strip, band, or ribbon of fastening material with loops or a strip, band, or ribbon of fastening material with hooks. If first window sill hook or loop attachment strip 50 is a strip, band, or ribbon of fastening material with loops, then first reflective member hook or loop attachment strip 40 is a strip, band, or ribbon of fastening material with hooks. First window sill hook or loop attachment strip 50 has a fastening surface and an adhesive surface. The fastening surface of first window sill hook or loop attachment strip 50 is the surface with the hooks or loops. The adhesive surface of first window sill hook or loop attachment strip 50 is coated with a layer of adhesive, glue, cement, or epoxy. The adhesive surface of first window sill hook or loop attachment strip 50 functions to attach first window sill hook or loop attachment strip 50 to the window sill 100. To install reversibly attachable window sill heliostat 5, first window sill hook or loop attachment strip 50 is attached to the upper surface of window sill 100, on the left side of the window sill 100, as depicted. Reversibly attachable window sill heliostat 5 is shipped to the customer obviously without the first window sill hook or loop attachment strip 50 attached to the upper surface of window sill 100. The adhesive surface of first window sill hook or loop attachment strip 50 is shipped to the customer with a release liner covering the adhesive, glue, cement, or epoxy to prevent the adhesive, glue, cement, or epoxy from sticking to anything prior to installation of the reversibly attachable window sill heliostat 5.

Second window sill hook or loop attachment strip 52 is a strip, band, or ribbon of hook-and-loop fastening material or a strip, band, or ribbon of hook-and-hook fastening material. Second window sill hook or loop attachment strip 52 is a strip, band, or ribbon of fastening material with hooks or a strip, band, or ribbon of fastening material with loops.

If second window sill hook or loop attachment strip 52 is a strip, band, or ribbon of fastening material with hooks, then second reflective member hook or loop attachment strip 42 is a strip, band, or ribbon of fastening material with loops or a strip, band, or ribbon of fastening material with hooks. If second window sill hook or loop attachment strip 52 is a strip, band, or ribbon of fastening material with loops, then second reflective member hook or loop attachment strip 42 is a strip, band, or ribbon of fastening material with hooks. Second window sill hook or loop attachment strip 52 has a fastening surface and an adhesive surface. The fastening surface of second window sill hook or loop attachment strip 52 is the surface with the hooks or loops. The adhesive surface of second window sill hook or loop attachment strip 52 is coated with a layer of adhesive, glue, cement, or epoxy. The adhesive surface of second window sill hook or loop attachment strip 52 functions to attach second window sill hook or loop attachment strip 52 to the window sill 100. To install reversibly attachable window sill heliostat 5, second window sill hook or loop attachment strip 52 is attached to the upper surface of window sill 100, on the right side of the window sill 100, as depicted. Reversibly attachable window sill heliostat 5 is shipped to the customer obviously without the second window sill hook or loop attachment strip 52 attached to the upper surface of window sill 100. The adhesive surface of second window sill hook or loop attachment strip 52 is shipped to the customer with a release liner covering the adhesive, glue, cement, or epoxy to prevent the adhesive, glue, cement, or epoxy from sticking to anything prior to installation of the reversibly attachable window sill heliostat 5.

As stated, reversibly attachable window sill heliostat 5 is reversibly rigidly attachable to a window sill 100 on a window in a house, apartment, or other building. A window sill 100 is the horizontal structure or surface at the bottom of a window. Window sills 100 serve to structurally support and hold the window in place. The exterior portion of a window sill 100 provides a mechanism for shedding rainwater away from the wall at the window opening. Therefore, window sills 100 are usually inclined slightly downward away from the window and wall, and often extend past the exterior face of the wall, so the water will drip off rather than run down the wall. Window sills 100 may be made of wood, vinyl, plastic, wood/plastic composite material, natural stone, cast stone, concrete, tile, or other non-porous materials to further increase their water resistance.

In order to install or attach the first embodiment of reversibly attachable window sill heliostat 5 to a window sill 100, the fastening surface of first window sill hook or loop attachment strip 50 is attached to the fastening surface of first reflective member hook or loop attachment strip 40 by pressing the two hook or loop attachment strips 40,50 together. As stated, the first window sill hook or loop attachment strip 40 is already attached to the lower surface of the horizontal reflective plane 20. Also, the fastening surface of second window sill hook or loop attachment strip 52 is attached to the fastening surface of second reflective member hook or loop attachment strip 42 by pressing the two hook or loop attachment strips 42,52 together. As stated, the second window sill hook or loop attachment strip 42 is already attached to the lower surface of the horizontal reflective plane 20. Next, the release liner on the adhesive surface of the first window sill hook or loop attachment strip 50 is removed and the release liner on the adhesive surface of the second window sill hook or loop attachment strip 52 is removed. Then, the whole assembly is pressed onto the upper surface of the window sill 100 in the desired position with the first edge of biplanar reflective member 10 aligned with and parallel with the inside edge of the window sill 100. The window should be open during installation and use of reversibly attachable window sill heliostat 5. The pressing activates the adhesive on the first and second window sill hook or loop attachment strips 50,52 to attach the adhesive surfaces of the first and second window sill hook or loop attachment strips 50,52 to the upper surface of the window sill 100. Reversibly attachable window sill heliostat 5 is now properly installed or attached to the window sill 100.

In order to remove or detach the first embodiment of reversibly attachable window sill heliostat 5 from the window sill 100, the biplanar reflective member 10, along with the first and second reflective member hook or loop attachment strips 40,42 are lifted up and separated from the first and second window sill hook or loop attachment strips 50,52 which remain attached to the window sill 100. During this process, the user must be careful to separate the fastening surfaces of the first and second reflective member hook or loop attachment strips 40,42 from the fastening surfaces of the first and second window sill hook or loop attachment strips 50,52, respectively, without removing the first and second reflective member hook or loop attachment strips 40,42 from the horizontal reflective plane 20 and without removing the first and second window sill hook or loop attachment strips 50,52 from the window sill 100. In this way, the reversibly attachable window sill heliostat 5 may be reversibly attached, removed, or detached from the window sill 100. Reversibly attachment is desired and very useful because users may not want the reversibly attachable window sill heliostat 5 installed all the time. Users may want it attached or installed during sunny days and then may want it removed or detached during cold, rainy, or snowy days. Please note that the window may be closed in order to keep the elements and weather out of the room in the usual manner while reversibly attachable window sill heliostat 5 is left in place and attached to the window sill 100.

Figure 9:
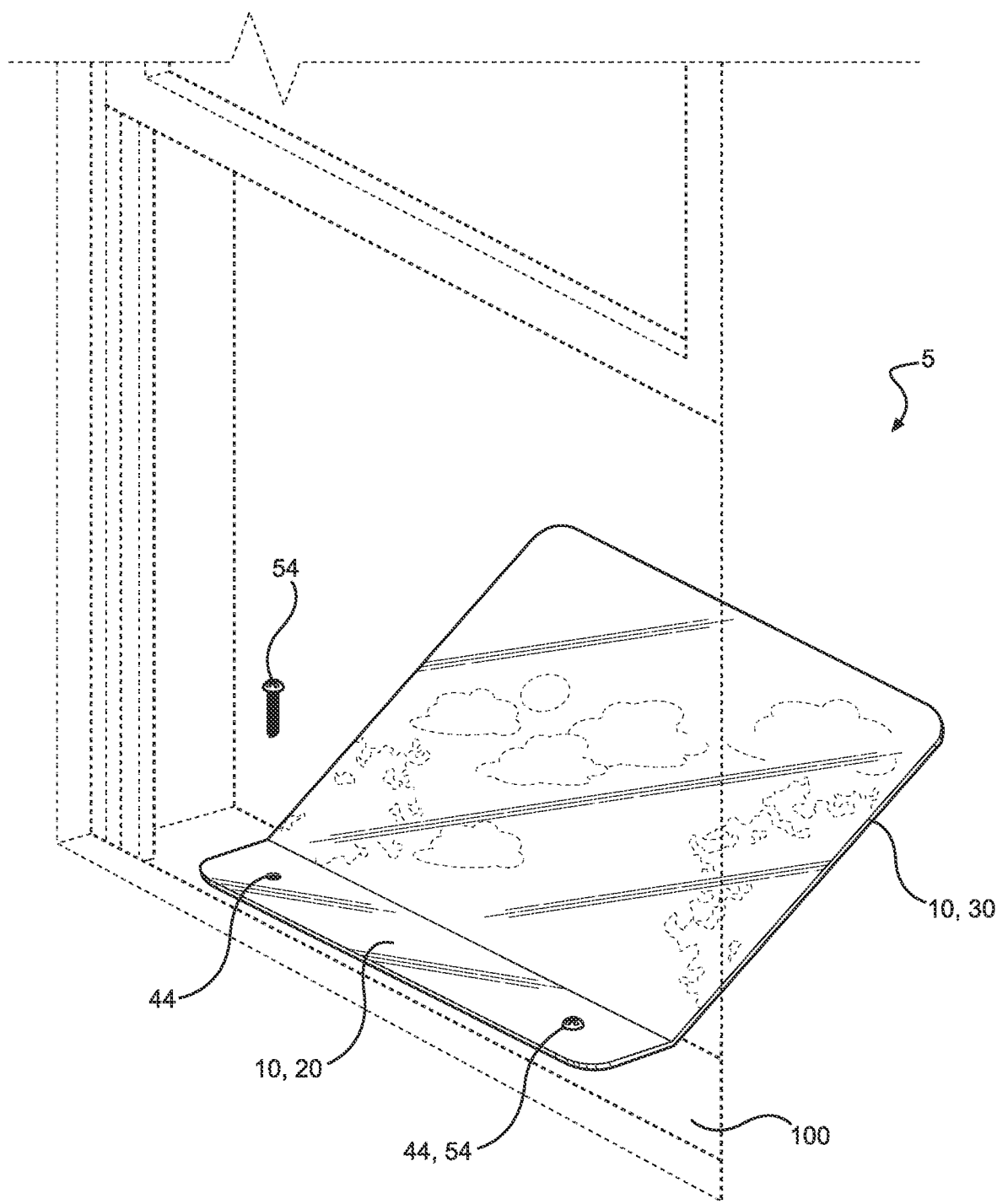
FIG. 9 is an environmental view of a second embodiment of reversibly attachable window sill heliostat depicting a reflection of the sky in the reversibly attachable window sill heliostat.
Figure 10:
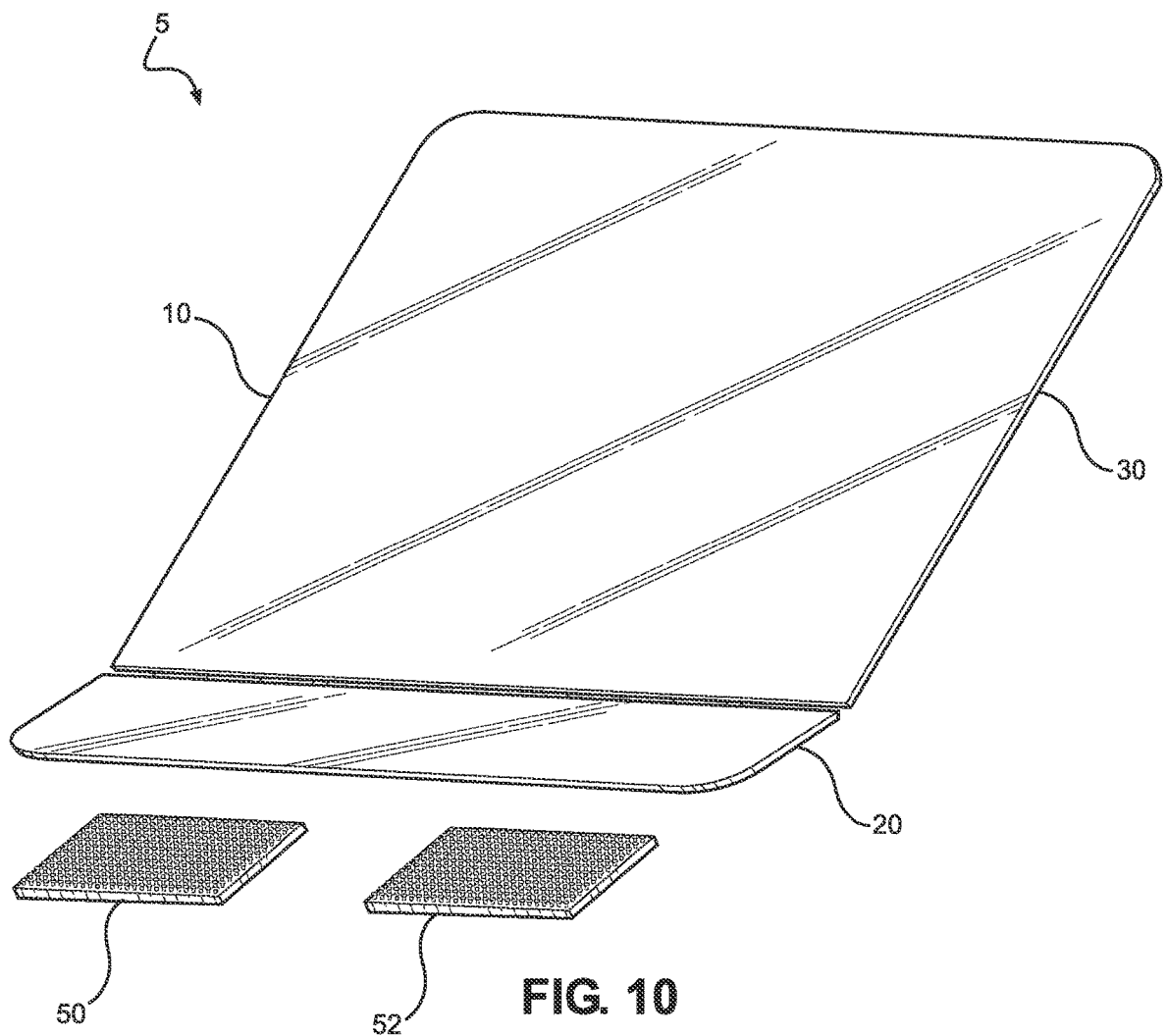
FIG. 10 is a front perspective view of a third embodiment of reversibly attachable window sill heliostat.
Figure 15:
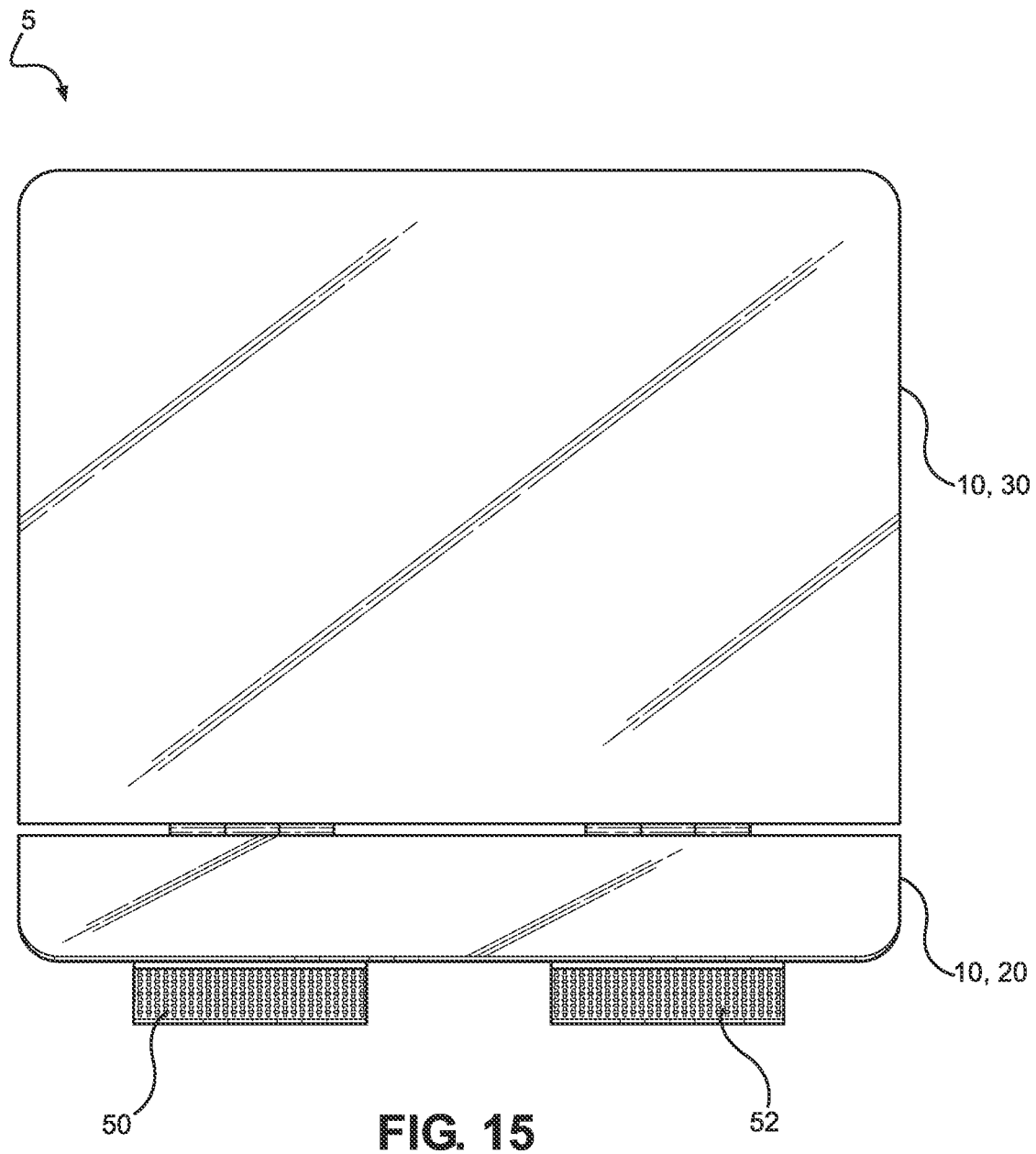
FIG. 15 is a front elevation view of the third embodiment of reversibly attachable window sill heliostat.
Figure 16:
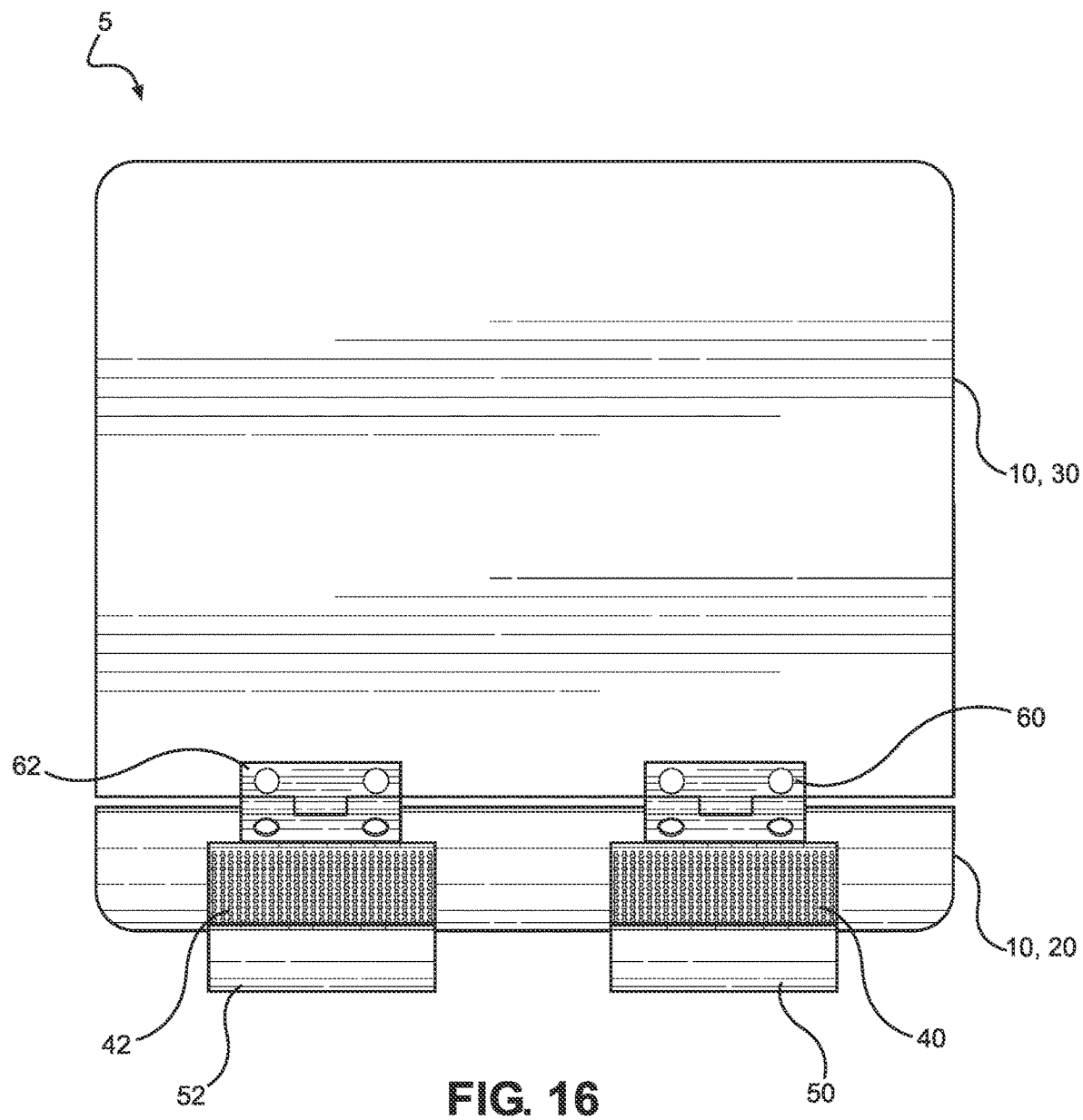
FIG. 16 is a rear elevation view of the third embodiment of reversibly attachable window sill heliostat.
Figure 17:
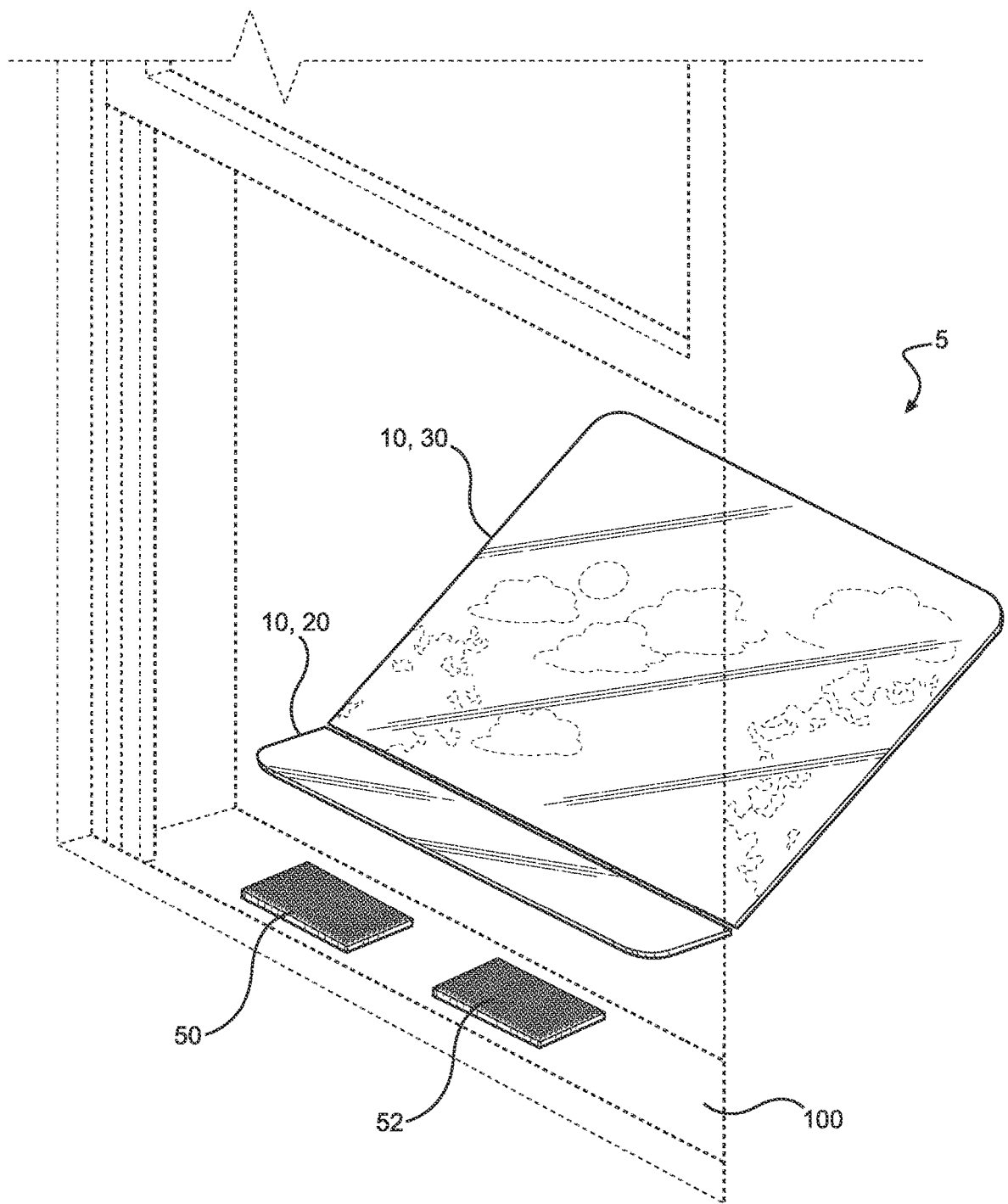
FIG. 17 is an environmental view of the third embodiment of reversibly attachable window sill heliostat depicting a reflection of the sky in the reversibly attachable window sill heliostat.

In a second embodiment, reversibly attachable window sill heliostat 5 comprises: a lightweight biplanar reflective member 10; a first window sill attachment fastener 54; and a second window sill attachment fastener 56. In this embodiment, lightweight biplanar reflective member 10 is exactly according to the above description with the addition of a first reflective member attachment hole 44 and a second reflective member attachment hole 46. In this embodiment, reversibly attachable window sill heliostat 5 does not include: a first reflective member hook or loop attachment strip 40, a second reflective member hook or loop attachment strip 42, a first window sill hook or loop attachment strip 50, or a second window sill hook or loop attachment strip 52. The second embodiment is depicted in FIG. 9.

First reflective member attachment hole 44 is a circular hole through the horizontal reflective plane 20. First reflective member attachment hole 44 has an inside diameter and a longitudinal axis. The longitudinal axis of first reflective member attachment hole 44 is perpendicular to the longitudinal axis and latitudinal axis of horizontal reflective plane 20. The inside diameter of first reflective member attachment hole 44 is slightly larger than the outer diameter of first window sill attachment fastener 54. First reflective member attachment hole 44 is located on the horizontal reflective plane 20, adjacent to the second edge of horizontal reflective plane 20.

Second reflective member attachment hole 46 is a circular hole through the horizontal reflective plane 20. Second reflective member attachment hole 46 has an inside diameter and a longitudinal axis. The longitudinal axis of second reflective member attachment hole 46 is perpendicular to the longitudinal axis and latitudinal axis of horizontal reflective plane 20. The inside diameter of second reflective member attachment hole 46 is slightly larger than the outer diameter of second window sill attachment fastener 56. Second reflective member attachment hole 46 is located on the horizontal reflective plane 20, adjacent to the third edge of horizontal reflective plane 20. In best mode, first and second reflective member attachment holes 44,46 are equivalent.

First window sill attachment fastener 54 is a screw or bolt with a head on a first end and length of male helical thread on a second end. The male helical thread has an outer diameter. Any known type of screw or bolt may be used. In best mode, first window sill attachment fastener 54 is a wood screw.

Second window sill attachment fastener 56 is a screw or bolt with a head on a first end and length of male helical thread on a second end. The male helical thread has an outer diameter. Any known type of screw or bolt may be used. In best mode, first window sill attachment fastener 54 is a wood screw. In best mode, first and second window sill attachment fasteners 54,56 are equivalent.

In order to install or attach the second embodiment of reversibly attachable window sill heliostat 5 to a window sill 100, the biplanar reflective member 10 is placed on the upper surface of the window sill 100 in the desired position with the first edge of biplanar reflective member 10 aligned with and parallel with the inside edge of the window sill 100. The window should be open during installation and use of reversibly attachable window sill heliostat 5. Next, the second end of first window sill attachment fastener 54 is placed into first reflective member attachment hole 44 and the first window sill attachment fastener 54 is installed into or screwed into the window sill 100 until the head of first window sill attachment fastener 54 clamps down onto biplanar reflective member 10. Then, the second end of second window sill attachment fastener 56 is placed into second reflective member attachment hole 46 and the second window sill attachment fastener 56 is installed into or screwed into the window sill 100 until the head of second window sill attachment fastener 56 clamps down onto biplanar reflective member 10. This completes the rigid attachment of biplanar reflective member 10 to the window sill 100. Reversibly attachable window sill heliostat 5 is now properly installed or attached to the window sill 100.

In order to remove or detach the second embodiment of reversibly attachable window sill heliostat 5 from the window sill 100, the first window sill attachment fastener 54 is removed from the window sill 100 by unscrewing the first window sill attachment fastener 54 and removing it from the first reflective member attachment hole 44. Then, the second window sill attachment fastener 56 is removed from the window sill 100 by unscrewing the second window sill attachment fastener 56 and removing it from the second reflective member attachment hole 46. Next, the biplanar reflective member 10 is simply picked up and removed from the window sill 100 leaving two holes in the window sill 100 from the first and second window sill attachment fasteners 54,56. This completes detachment of biplanar reflective member 10 to the window sill 100. In this way, the reversibly attachable window sill heliostat 5 may be reversibly attached, removed, or detached from the window sill 100. Reversibly attachment is desired and very useful because users may not want the reversibly attachable window sill heliostat 5 installed all the time. Users may want it attached or installed during sunny days and then may want it removed or detached during cold, rainy, or snowy days. Please note that the window may be closed in order to keep the elements and weather out of the room in the usual manner while reversibly attachable window sill heliostat 5 is left in place and attached to the window sill 100.

In a third embodiment, reversibly attachable window sill heliostat 5 comprises: a lightweight biplanar reflective member 10; a first reflective member hook or loop attachment strip 40; a second reflective member hook or loop attachment strip 42; a first window sill hook or loop attachment strip 50; a second window sill hook or loop attachment strip 52: a first adjustable hinge 60; and a second adjustable hinge 62. In this embodiment, first reflective member hook or loop attachment strip 40, second reflective member hook or loop attachment strip 42, first window sill hook or loop attachment strip 50, and second window sill hook or loop attachment strip 52 are exactly according to the above description. The third embodiment is depicted in FIGS. 10-17.

In the third embodiment, lightweight biplanar reflective member 10 comprises: a horizontal reflective plane 20 and an angled reflective plane 30. Horizontal reflective plane 20 is a rigid planar member with an upper surface, a lower surface, a length, a width, a thickness, a first edge, a second edge, a third edge, a fourth edge, a longitudinal axis, and a latitudinal axis. The longitudinal axis of horizontal reflective plane 20 is parallel with the length of horizontal reflective plane 20. The latitudinal axis of horizontal reflective plane 20 is parallel with the width of horizontal reflective plane 20. The upper surface of horizontal reflective plane 20 is reflective and has a reflectivity of 95 percent or greater at ninety degree incidence. A reflectivity of 95 percent or greater is required to project or reflect a sufficient amount of natural sunlight light into the house, apartment, or other building.

Angled reflective plane 30 is a rigid planar member with an upper surface, a lower surface, a length, a width, a thickness, a first edge, a second edge, a third edge, a fourth edge, a longitudinal axis, and a latitudinal axis. The longitudinal axis of angled reflective plane 30 is parallel with the length of angled reflective plane 30. The latitudinal axis of angled reflective plane 30 is parallel with the width of angled reflective plane 30. The upper surface of angled reflective plane 30 is reflective and has a reflectivity of 95 percent or greater at normal incidence or ninety degree incidence. A reflectivity of 95 percent or greater is required to project or reflect a sufficient amount of natural sunlight light into the house, apartment, or other building.

The width of horizontal reflective plane 20 is equivalent to the width of angled reflective plane 30. The width of horizontal reflective plane 20 and angled reflective plane 30 is about 10-80 inches. The length of angled reflective plane 30 is much greater than the length of horizontal reflective plane 20. The length of horizontal reflective plane 20 is about 1-15 inches. The length of angled reflective plane 30 is about 10-50 inches. The thickness of horizontal reflective plane 20 is equivalent to the thickness of angled reflective plane 30. The thickness of horizontal reflective plane 20 and angled reflective plane 30 is about 0.05-0.75 inches.

The third edge of horizontal reflective plane 20 is pivotally attached to the first edge of angled reflective plane 30 so that the second edge of horizontal reflective plane 20 aligns with the second edge of angled reflective plane 30 and the fourth edge of horizontal reflective plane 20 aligns with the fourth edge of angled reflective plane 30. Pivotal attachment is accomplished by first and second adjustable hinges 60,62.

First adjustable hinge 60 is a torsion hinge, torque hinge, or friction hinge. Second adjustable hinge 62 is a torsion hinge, torque hinge, or friction hinge. A hinge is a mechanical bearing that connects two solid objects, allowing only a limited angle of rotation between them. The two objects connected by a hinge rotate relative to each other about a fixed axis of rotation, with all other translations or rotations prevented. A hinge has one degree of freedom. A torsion hinge, torque hinge, or friction hinge is a hinge that provides resistance to the pivoting motion of the hinge itself so that the torsion hinge, torque hinge, or friction hinge may be moved or rotated by hand and then left to remain at the adjusted or desired angle of rotation. There is just enough friction to hold the hinge at the desired angle of rotation but no too much to prevent the hinge form being rotated by hand and set at the desired angle of rotation in the first place. With the pivotal attachment of horizontal reflective plane 20 to angled reflective plane 30 by first and second adjustable hinges 60,62, angled reflective plane 30 may be adjusted to any desired angle to allow for the proper or desired reflection of the sky or sun into the room from the angled reflective plane 30. Any known torsion hinge, torque hinge, or friction hinge may be used.

First adjustable hinge 60 comprises: a first wing, a second wing, and a pivot pin. Pivot pin is a rigid solid cylindrical member. First wing is a rigid planar member. Second wing is a rigid planar member. First wing is pivotally attached to the pivot pin so that first wing may rotate or pivot around pivot pin. Second wing is pivotally attached to the pivot pin so that second wing may rotate or pivot around pivot pin. The first wing of first adjustable hinge 60 is rigidly attached to the horizontal reflective plane 20 adjacent to the second edge of horizontal reflective plane 20. The second wing of first adjustable hinge 60 is rigidly attached to the angled reflective plane 30 adjacent to the second edge of angled reflective plane 30.

Second adjustable hinge 62 comprises: a first wing, a second wing, and a pivot pin. Pivot pin is a rigid solid cylindrical member. First wing is a rigid planar member. Second wing is a rigid planar member. First wing is pivotally attached to the pivot pin so that first wing may rotate or pivot around pivot pin. Second wing is pivotally attached to the pivot pin so that second wing may rotate or pivot around pivot pin. The first wing of second adjustable hinge 62 is rigidly attached to the horizontal reflective plane 20 adjacent to the third edge of horizontal reflective plane 20, as depicted. The second wing of second adjustable hinge 62 is rigidly attached to the angled reflective plane 30 adjacent to the third edge of angled reflective plane 30, as depicted. In best mode, first adjustable hinge 60 and second adjustable hinge 62 are equivalent.

The third embodiment of reversibly attachable window sill heliostat 5 is attached or installed to a window sill 100 in the exact same manner as stated above with the first embodiment. The third embodiment of reversibly attachable window sill heliostat 5 is removed or detached from the window sill 100 in the exact same manner as stated above with the first embodiment.

Figure 18:
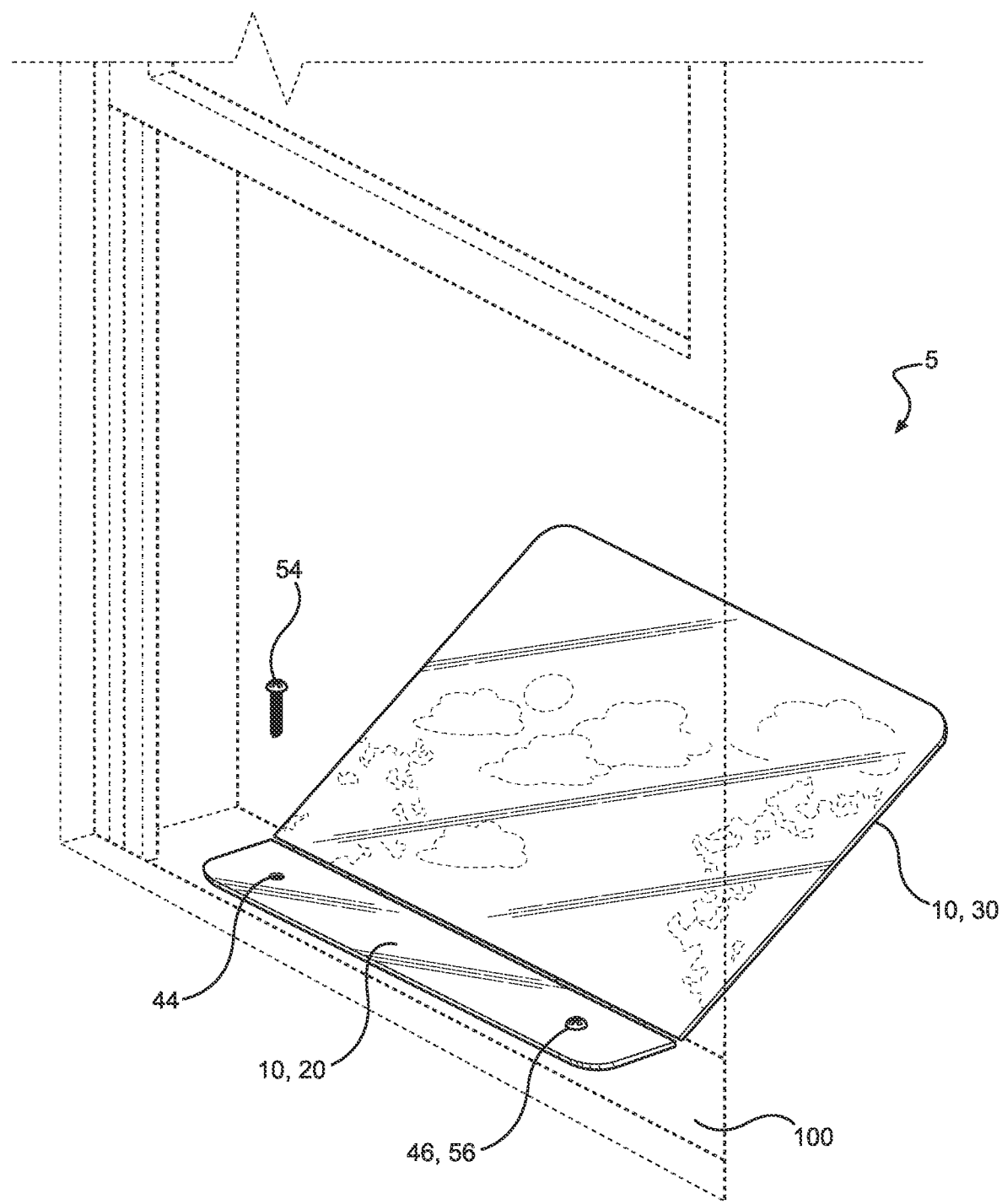
FIG. 18 is an environmental view of a fourth embodiment of reversibly attachable window sill heliostat depicting a reflection of the sky in the reversibly attachable window sill heliostat.

In a fourth embodiment, reversibly attachable window sill heliostat 5 comprises: a lightweight biplanar reflective member 10; a first window sill attachment fastener 54; a second window sill attachment fastener 56; a first adjustable hinge 60; and a second adjustable hinge 62. In this embodiment, lightweight biplanar reflective member 10 is exactly according to the above description of the third embodiment with the addition of a first reflective member attachment hole 44 and a second reflective member attachment hole 46. In this embodiment, first adjustable hinge 60 and a second adjustable hinge 62 are exactly according to the above description of the third embodiment. In the fourth embodiment, reversibly attachable window sill heliostat 5 does not include: a first reflective member hook or loop attachment strip 40, a second reflective member hook or loop attachment strip 42, a first window sill hook or loop attachment strip 50, or a second window sill hook or loop attachment strip 52. The fourth embodiment is depicted in FIG. 18.

First reflective member attachment hole 44 is a circular hole through the horizontal reflective plane 20. First reflective member attachment hole 44 has an inside diameter and a longitudinal axis. The longitudinal axis of first reflective member attachment hole 44 is perpendicular to the longitudinal axis and latitudinal axis of horizontal reflective plane 20. The inside diameter of first reflective member attachment hole 44 is slightly larger than the outer diameter of first window sill attachment fastener 54. First reflective member attachment hole 44 is located on the horizontal reflective plane 20, adjacent to the second edge of horizontal reflective plane 20.

Second reflective member attachment hole 46 is a circular hole through the horizontal reflective plane 20. Second reflective member attachment hole 46 has an inside diameter and a longitudinal axis. The longitudinal axis of second reflective member attachment hole 46 is perpendicular to the longitudinal axis and latitudinal axis of horizontal reflective plane 20. The inside diameter of second reflective member attachment hole 46 is slightly larger than the outer diameter of second window sill attachment fastener 56. Second reflective member attachment hole 46 is located on the horizontal reflective plane 20, adjacent to the third edge of horizontal reflective plane 20. In best mode, first and second reflective member attachment holes 44,46 are equivalent.

First window sill attachment fastener 54 is a screw or bolt with a head on the first end and length of male helical thread on the second end. The male helical thread has an outer diameter. Any known type of screw or bolt may be used. In best mode, first window sill attachment fastener 54 is a wood screw.

Second window sill attachment fastener 56 is a screw or bolt with a head on the first end and length of male helical thread on the second end. The male helical thread has an outer diameter. Any known type of screw or bolt may be used. In best mode, first window sill attachment fastener 54 is a wood screw. In best mode, first and second window sill attachment fasteners 54,56 are equivalent.

In order to install or attach the fourth embodiment of reversibly attachable window sill heliostat 5 to a window sill 100, the biplanar reflective member 10 is placed on the upper surface of the window sill 100 in the desired position with the first edge of biplanar reflective member 10 aligned with and parallel with the inside edge of the window sill 100. The window should be open during installation and use of reversibly attachable window sill heliostat 5. Next, the second end of first window sill attachment fastener 54 is placed into first reflective member attachment hole 44 and the first window sill attachment fastener 54 is installed into or screwed into the window sill 100 until the head of first window sill attachment fastener 54 clamps down onto biplanar reflective member 10. Then, the second end of second window sill attachment fastener 56 is placed into second reflective member attachment hole 46 and the second window sill attachment fastener 56 is installed into or screwed into the window sill 100 until the head of second window sill attachment fastener 56 clamps down onto biplanar reflective member 10. This completes the rigid attachment of biplanar reflective member 10 to the window sill 100. Reversibly attachable window sill heliostat 5 is now properly installed or attached to the window sill 100.

In order to remove or detach the fourth embodiment of reversibly attachable window sill heliostat 5 from the window sill 100, the first window sill attachment fastener 54 is removed from the window sill 100 by unscrewing the first window sill attachment fastener 54 and removing it from the first reflective member attachment hole 44. Then, the second window sill attachment fastener 56 is removed from the window sill 100 by unscrewing the second window sill attachment fastener 56 and removing it from the second reflective member attachment hole 46. Next, the biplanar reflective member 10 is simply picked up and removed from the window sill 100 leaving two holes in the window sill 100 from the first and second window sill attachment fasteners 54,56. This completes detachment of biplanar reflective member 10 to the window sill 100. In this way, the reversibly attachable window sill heliostat 5 may be reversibly attached, removed, or detached from the window sill 100. Reversibly attachment is desired and very useful because users may not want the reversibly attachable window sill heliostat 5 installed all the time. Users may want it attached or installed during sunny days and then want it removed or detached during cold, rainy, or snowy days.

What is claimed is:

1. A reversibly attachable window sill heliostat comprising: a lightweight biplanar reflective member; a first reflective member hook or loop attachment strip; a second reflective member hook or loop attachment strip; a first window sill hook or loop attachment strip; and a second window sill hook or loop attachment strip, wherein, said lightweight biplanar reflective member comprises: a horizontal reflective plane and an angled reflective plane, wherein, said horizontal reflective plane is a rigid planar member with an upper surface, a lower surface, a length, a width, a thickness, a first edge, a second edge, a third edge, a fourth edge, a longitudinal axis, and a latitudinal axis, said upper surface of said horizontal reflective plane is reflective and has a reflectivity of 95 percent or greater at ninety degree incidence, said angled reflective plane is a rigid planar member with an upper surface, a lower surface, a length, a width, a thickness, a first edge, a second edge, a third edge, a fourth edge, a longitudinal axis, and a latitudinal axis, said upper surface of said angled reflective plane is reflective and has a reflectivity of 95 percent or greater at normal incidence or ninety degree incidence, said width of said horizontal reflective plane is equal to said width of said angled reflective plane, said length of said angled reflective plane greater than said length of said horizontal reflective plane, said third edge of said horizontal reflective plane is rigidly attached or connected to said first edge of said angled reflective plane so that said second edge of said horizontal reflective plane aligns with said second edge of said angled reflective plane and said fourth edge of said horizontal reflective plane aligns with the said fourth edge of said angled reflective plane and said upper surface of said horizontal reflective plane forms a 135-175 degree angle with said upper surface of said angled reflective plane, said first reflective member hook or loop attachment strip is a strip, band, or ribbon of hook-and-loop fastening material or a strip, band, or ribbon of hook-and-hook fastening material, wherein, said first reflective member hook or loop attachment strip has a fastening surface and an adhesive surface, said second reflective member hook or loop attachment strip is a strip, band, or ribbon of hook-and-loop fastening material or a strip, band, or ribbon of hook-and-hook fastening material, said second reflective member hook or loop attachment strip has a fastening surface and an adhesive surface, said first window sill hook or loop attachment strip is a strip, band, or ribbon of hook-and-loop fastening material or a strip, band, or ribbon of hook-and-hook fastening material, said first window sill hook or loop attachment strip has a fastening surface and an adhesive surface, said second window sill hook or loop attachment strip is a strip, band, or ribbon of hook-and-loop fastening material or a strip, band, or ribbon of hook-and-hook fastening material, said second window sill hook or loop attachment strip has a fastening surface and an adhesive surface, said adhesive surface of said first reflective member hook or loop attachment strip is attached to said lower surface of said horizontal reflective plane, adjacent to said second edge of said horizontal reflective plane, said adhesive surface of said second reflective member hook or loop attachment strip is attached to said lower surface of said horizontal reflective plane, adjacent to said third edge of said horizontal reflective plane, said fastening surface of said first window sill hook or loop attachment strip is reversibly attached to said fastening surface of said first reflective member hook or loop attachment strip, said fastening surface of said second window sill hook or loop attachment strip is reversibly attached to said fastening surface of said second reflective member hook or loop attachment strip, said adhesive surface of said first window sill hook or loop attachment strip is attached to an upper surface of a window sill, and said adhesive surface of said second window sill hook or loop attachment strip is attached is upper surface of said window sill.

* * * * *